United States Patent [19]

Sternberg

[11] 4,369,430
[45] * Jan. 18, 1983

[54] IMAGE ANALYZER WITH CYCLICAL NEIGHBORHOOD PROCESSING PIPELINE

[75] Inventor: Stanley R. Sternberg, Ann Arbor, Mich.

[73] Assignee: Environmental Research Institute of Michigan, Ann Arbor, Mich.

[*] Notice: The portion of the term of this patent subsequent to Sep. 11, 1996, has been disclaimed.

[21] Appl. No.: 150,833

[22] Filed: May 19, 1980

[51] Int. Cl.³ .................. G06K 9/36; G06F 15/20
[52] U.S. Cl. .................................. 340/146.3 MA
[58] Field of Search .......... 340/146.3 MA, 146.3 H, 340/146.3 R; 364/515, 300, 200, 900, 518; 356/39, 388

[56] References Cited

U.S. PATENT DOCUMENTS

| | | | |
|---|---|---|---|
| 3,106,698 | 10/1963 | Unger | 340/146.3 B |
| 3,106,699 | 10/1963 | Kamentsky | 340/146.3 H |
| 3,196,398 | 7/1965 | Baskin | 340/146.3 H |
| 3,214,574 | 10/1965 | Landsman et al. | 340/146.3 H |
| 3,287,703 | 11/1966 | Slotnick | 364/200 |
| 3,289,164 | 11/1966 | Rabinow | 340/146.3 H |
| 3,339,179 | 8/1967 | Shelton, Jr. et al. | 340/146.3 H |
| 3,573,789 | 4/1971 | Sharp et al. | 340/146.3 H |
| 3,597,731 | 7/1969 | Reitboeck | 340/146.3 H |
| 3,624,604 | 11/1971 | Gibbard | 340/146.3 MA |
| 3,636,513 | 1/1972 | Tisdale | 340/146.3 AC |
| 3,638,188 | 1/1972 | Pincoffs et al. | 340/146.3 AC |
| 3,706,071 | 12/1972 | Gray | 340/146.3 MA |
| 3,723,970 | 3/1973 | Stoller | 340/146.3 AG |
| 3,748,644 | 7/1973 | Tisdale | 340/149 A |
| 3,761,876 | 9/1973 | Flaherty et al. | 340/146.3 H |
| 3,805,038 | 4/1974 | Serra | . |
| 3,811,110 | 5/1974 | Inose et al. | 340/146.3 H |
| 3,815,095 | 6/1974 | Wester | 364/200 |
| 3,846,754 | 11/1974 | Oka et al. | 340/146.3 MA |
| 3,878,530 | 4/1975 | Wilmot | 343/5 DP |
| 3,889,234 | 6/1975 | Makihara et al. | 340/146.3 MA |
| 3,889,771 | 8/1975 | Saraga et al. | 340/146.3 MA |
| 3,905,045 | 9/1975 | Nickel | 364/300 |
| 3,968,475 | 6/1976 | McMahon | 340/146.3 E |
| 4,003,024 | 1/1977 | Riganati et al. | 340/146.3 MA |
| 4,060,713 | 11/1977 | Golay | 364/515 |
| 4,167,728 | 9/1979 | Sternberg | 364/515 |
| 4,174,514 | 11/1979 | Sternberg | 340/146.3 MA |
| 4,210,962 | 7/1980 | Marsh et al. | 364/300 |

OTHER PUBLICATIONS

Golay, Marcel, J. E., "Hexagonal Parallel Pattern Transformations", IEEE Trans. on Computers, vol. C-18, No. 8, pp. 733-740, (Aug. 1969).
Klein, J. C. and Serra, J., "The Texture Analyzer", J. of Microscopy, vol. 95, Pt. 2, pp. 349-356 (Nov. 1971).
Matheron, G., "Random Sets Theory and its Application to Stereology", J. of Microscopy, vol. 95, Pt. 1, pp. 15-23 (Feb. 1972).
McCormick, Bruce H., "The Illinois Pattern Recognition Computer—Illiac III", IEEE Trans. on Electronic Computers, vol. EC-12, pp. 791-813 (Dec. 1963).
Preston, Kendall, Jr., "Feature Extraction by Golay Hexagonal Pattern Transforms", IEEE Trans. on Computers, vol. C-20, No. 9 (Sep. 1971).
Serra, J., "Stereology and Structuring Elements", J. of Microscopy, vol. 95, Pt. 1, pp. 93-103 (Feb. 1972).
Unger, S. H., "Pattern Detection and Recognition", Proc. of the IRF, vol. 47, pp. 1737-1752 (1959).
Page, "Technique for Bit-Array Manipulation," IBM Tech. Disclosure Bulletin, vol. 16, No. 6, Nov. 1973, pp. 2021-2025.
Brickman, "Optical Char. Rec. with Programmable Logic Arrays," IBM Tech. Disclosure Bulletin, vol. 18, No. 5, Oct. 1975, pp. 1520-1521.
"A Parallel Picture Processing Machine", by Kruse, IEEE Transactions on Computers, vol. C-22, No. 12, (Dec. 1973).
Castleman, Digital Image Processing (Prentice-Hall, Inc. 1979), pp. 96-97.

*Primary Examiner*—Leo H. Boudreau
*Attorney, Agent, or Firm*—Krass, Young & Schivley

[57] ABSTRACT

An image analyzer system includes a pipeline containing a given number of serially connected neighborhood transformation stages. Each stage includes a neighborhood extraction portion for sequentially accessing substantially all of the neighborhoods in a matrix of pixels constituting an image. Transformation control logic in each stage is operative for analyzing the pixels contained in the neighborhood extraction portion and provides a transformation output signal to the next stage in the pipeline. A central controller serves to program the stages to thereby define the type of transformation to be performed by the neighborhood transformation logic. Feedback means are provided for selectively coupling the output of the last stage in the pipeline to the input of the first stage. In one embodiment, the pipeline is loaded with all of the image pixels and the stages are reprogrammed before the pixels are recirculated through the stages thereby permitting a greater number of transformations to be performed than there are stages in the pipeline. In another embodiment, the feedback line contains indicia of the transformation output of a first frame of pixel data for comparison with succeeding frames to thereby detect changes therebetween.

7 Claims, 5 Drawing Figures

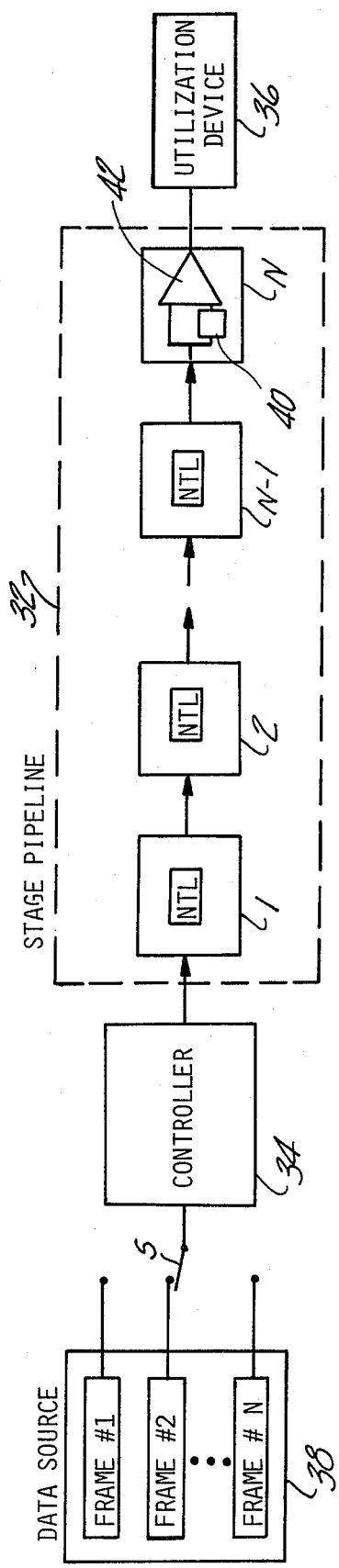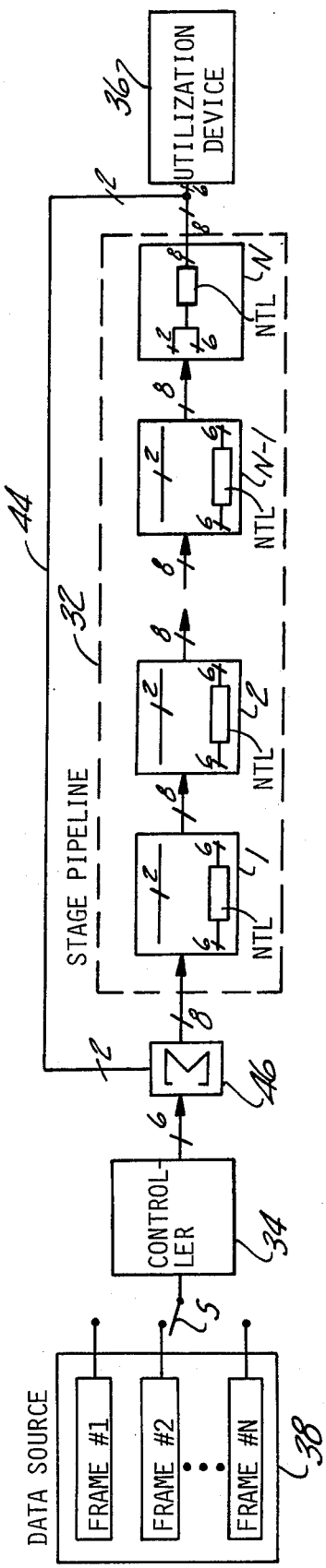

IMAGE ANALYZER WITH CYCLICAL NEIGHBORHOOD PROCESSING PIPELINE

BACKGROUND OF THE INVENTION

This invention relates to image analyzers. More particularly, it involves a pipeline of neighborhood serial transformation stages for analyzing image data.

In commonly assigned U.S. Pat. No. 4,167,728 to Sternberg, there is disclosed a new class of special purpose computers for implementing pattern recognition and analysis. The system includes a chain or pipeline of serial neighborhood transformation modules or stages. Each stage includes a neighborhood extraction portion for sequentially accessing an array of neighboring pixels in the image, the image being represented by a serial stream of digital pixel values corresponding to a matrix of points in the image. Neighborhood transformation logic generates a tranformation output to the next stage depending upon the pixel values contained in the neighborhood extraction portion. The transformed data is a function of the value of the equivalent data point in the input image matrix and the values of the neighboring pixels in the image. The nature of the transformation performed by each of the processing stages may be modified under control of a central programmable unit which communicates with each stage. In the embodiment disclosed in this patent the output of the last stage of the pipeline was coupled to a utilization device such as a display for displaying the transformed matrix.

The present invention is directed to techniques for increasing the image processing capabilities of such a system.

SUMMARY OF THE INVENTION

According to one aspect of this invention, feedback means are provided for coupling the output of the last stage of the pipeline to the input of the first stage. In a preferred embodiment, enough stages are included in the pipeline to contain all of the pixels in the image matrix. The stages are first programmed to perform a first sequence of neighborhood transformations. The pixels are shifted through the pipeline with each of the stages performing the programmed transformation. Before the pixels are recirculated through the pipeline, the stages are progressively reprogrammed with new control instructions whereby the image pixels may be transformed a greater number of times than there are stages in the pipeline.

Pursuant to another aspect of this invention, the pipeline is used to transform two image frames of pixel data from a data source. The transformation outputs of the pipeline for each of the frames are compared with one another. Accordingly, changes in the image contained in the two frames of pixel data can be detected. Preferably, indicia of the transformation output of the pipeline for one of the frames is fed back and combined with pixel data from subsequent frames. The fed back indicia is carried along in the pipeline but is not transformed by the stages until the complete transformation sequence of the subsequent frame is completed. The last stage in the pipeline does take into account the fed back indicia as well as the transformed pixel values of the subsequent frame. Accordingly, the final transformation output of the pipeline is a function of two frames of pixel data.

BRIEF DESCRIPTION OF THE DRAWINGS

These and other advantages of the present invention will become apparent upon reading the following specification and by reference to the drawings in which:

FIG. 4 is a schematic diagram showing an alternative embodiment of the present invention; and FIG. 5 is a schematic diagram showing still another embodiment of the present invention.

DESCRIPTION OF THE PREFERRED EMBODIMENT

Figure 1:
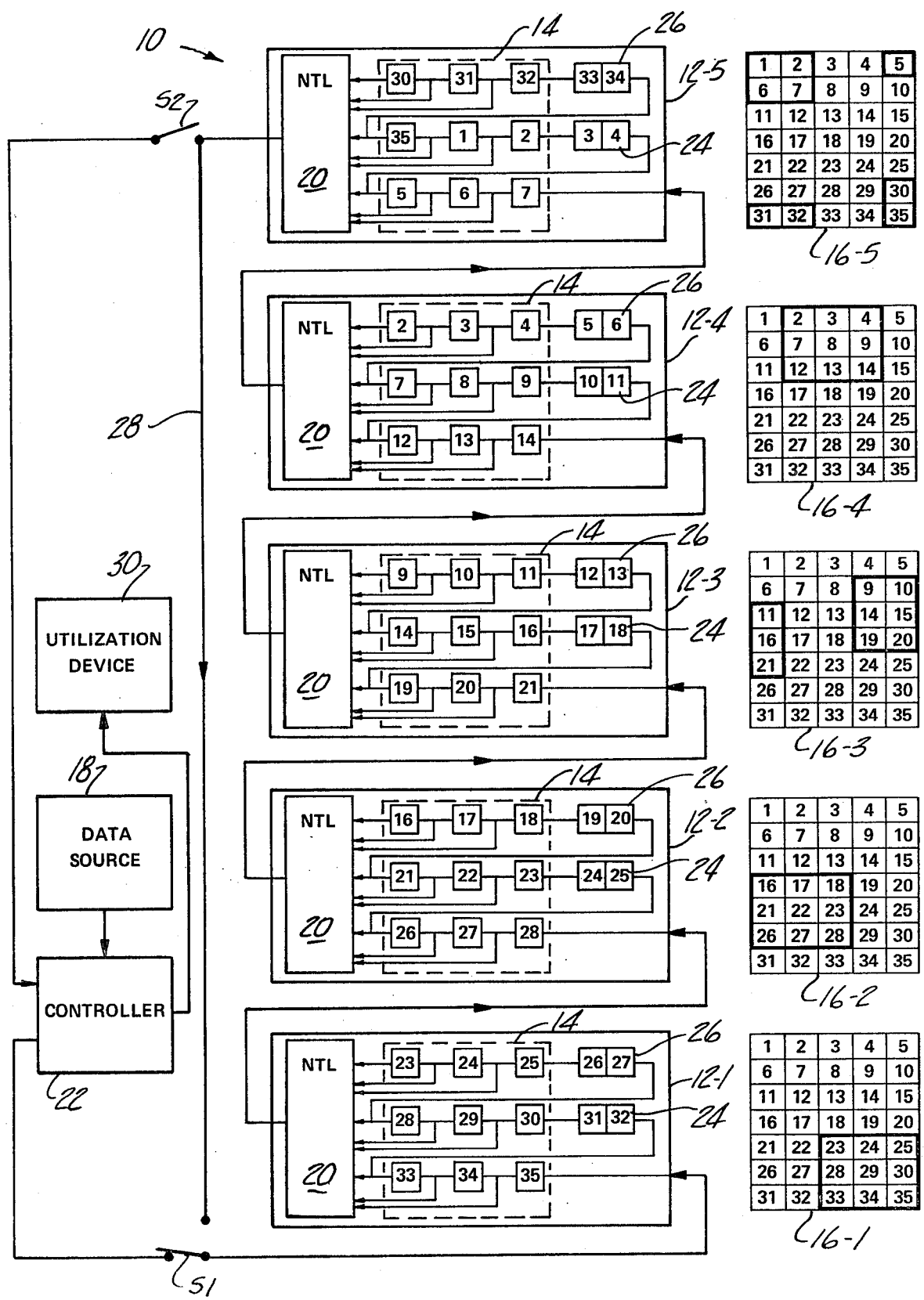
FIG. 1 is a schematic diagram of one embodiment of this invention during one time step.

Referring now to FIG. 1, the image processor of the present invention takes the form of a pipeline 10 of serially connected neighborhood transformation stages 12. In this embodiment there are five stages 12-1 to 12-5 but it should be understood that this number may vary greatly. The circuitry in each stage includes a neighborhood extraction portion 14 for accessing an array of neighboring pixels. In this specific example, the image to be analyzed is represented by a matrix 16 of thirty-five pixels arranged in a 5×7 array. It should be understood that the image matrix 16 generally includes many more such pixel values in normal use. However, the matrix has been simplified in order to aid in more easily understanding the broad concept of the present invention. The pixel values are generally derived from a scanner and are supplied thereby in a raster scan line format. The matrix of pixel values are supplied by data source 18 in a serial fashion to the pipeline 10.

Each stage 12 further includes neighborhood transformation logic 20 which provides a transformation output signal depending upon the contents of the pixels contained in the neighborhood extraction portion 14. The type of analysis performed by the neighborhood transformation logic 20 in each stage 10 is determined by control or command instructions from a central programmable controller 22. Line storage device 24, 26 in each stage provide an appropriate delay such that each shift of the pixel stream will place a new window of neighboring pixels in the neighborhood extraction portion 14. The lengths of the line delays 24, 26 will of course depend upon the length of the lines in the image matrix 16 as is well known in the art. Other methods of loading neighborhood extraction portion 14 with successive neighborhood windows can be employed.

The system thus far described is substantially the same as that disclosed in the above-identified U.S. Pat. No. 4,167,728 to Sternberg which is hereby incorporated by reference. The pipeline 10 can be programmed by controller 22 to provide a wide variety of neighborhood transformations. Examples of such neighborhood transformations are more fully described in U.S. Pat. No. 4,322,716 entitled "Method and Apparatus For Pattern Recognition and Detection"; U.S. Pat. No. 4,301,443 entitled "Bit Enable Circuitry For An Image Analyzer System"; and U.S. Pat. No. 4,290,049 entitled "Dynamic Data Correction Generator For An Image Analyzer System"; all of which were filed on Sept. 10, 1979 and are assigned to the same assignee as the present invention. These applications are likewise incorporated by reference. Briefly, through a series of erosion and dilation transformation steps carried out in each stage, the spatial location of a particular object or pattern can be located in the image matrix. The number of stages required to perform the entire transformation sequence will vary depending upon the complexity of the task. However, one aspect of the present invention is directed toward minimizing the number of stages required to perform any particular sequence.

Figure 2:
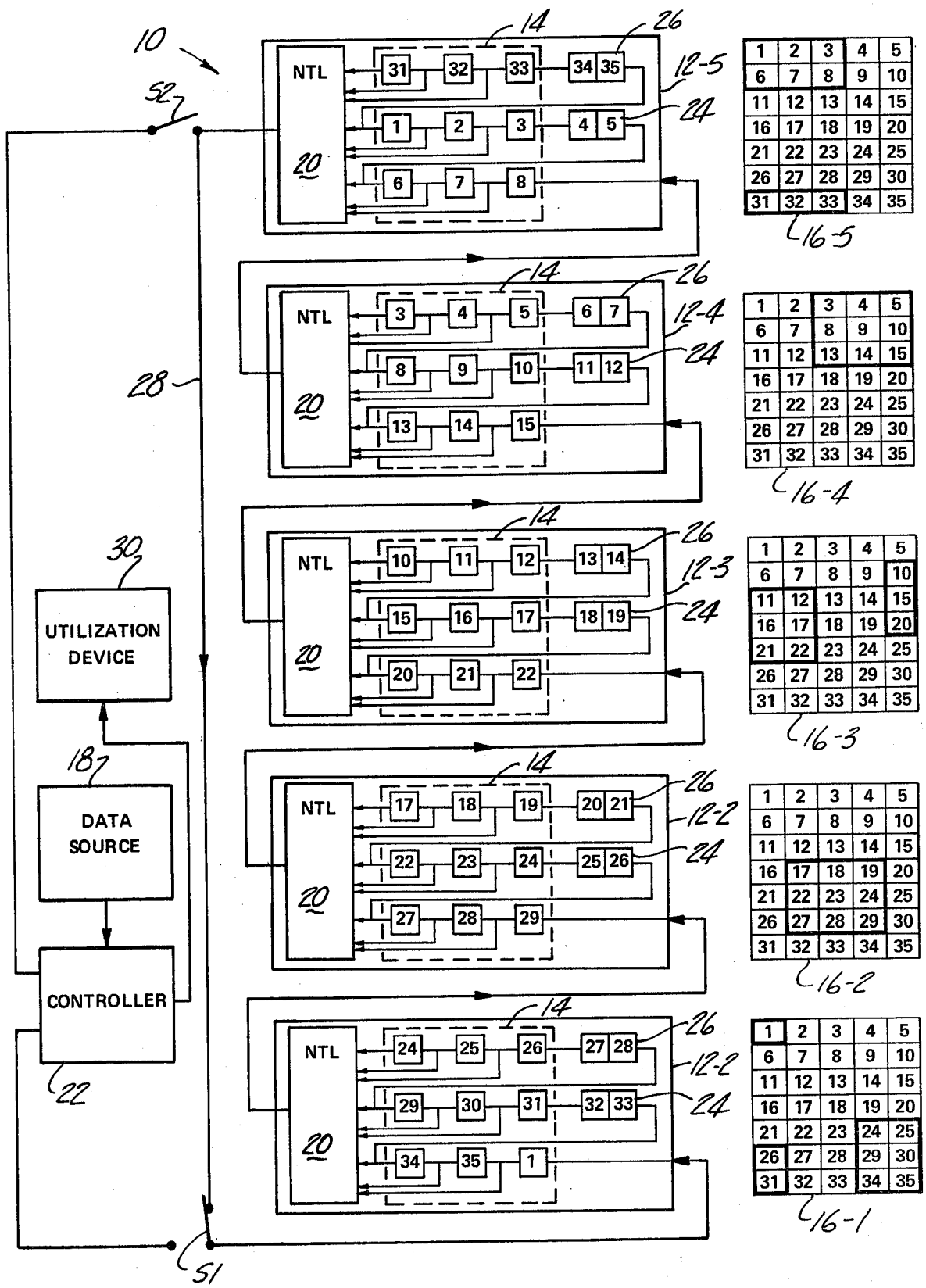
FIG. 2 is a schematic diagram showing the shift in pixel values in the embodiment shown in FIG. 1 during the next time step.
Figure 3:
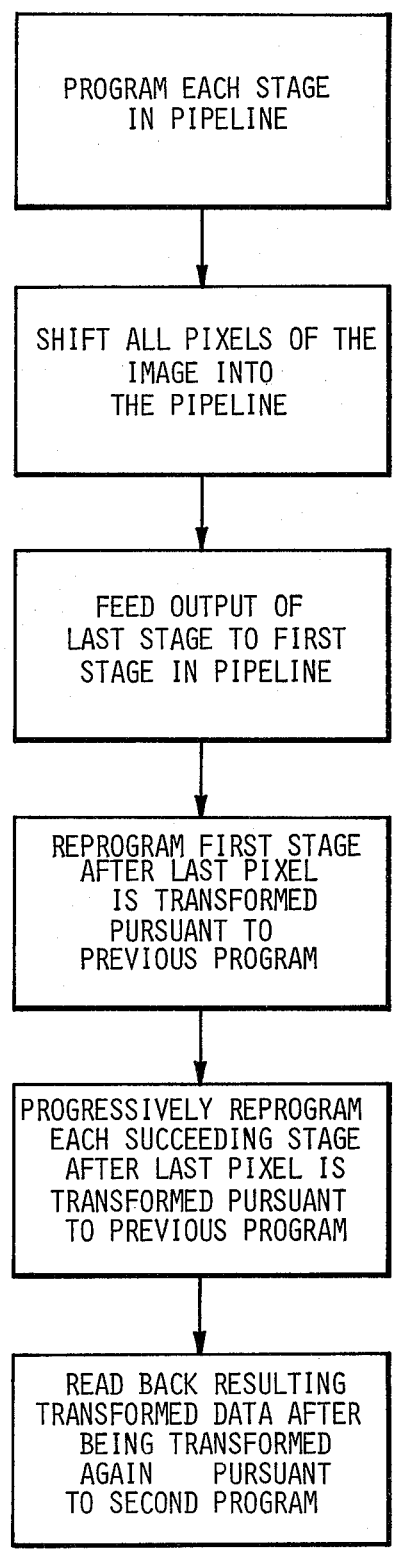
FIG. 3 is a flow chart showing the sequence of steps in carrying out a preferred method of utilizing the system of the present invention.

By way of a specific example and with reference to FIGS. 1-3, assume that there are ten transformational steps required in a given sequence for locating a particular object in image matrix 16. The neighborhood transformation logic 20 of stages 12-1 to 12-5 are first loaded with control instructions from controller 22 for carrying out the first five steps of the sequence. The pixel data from data source 18 is then loaded into pipeline 10. The position of a switching device S1 conceptually represents that the data entering the pipeline is fresh data from data source 18. The pixel data may be conditioned and then serially provided in an appropriately timed manner by controller 22. Additionally, controller 22 controls the position of switching device S1. It should be noted that switching device S1 may be a variety of electronic components and may comprise, for example, conventional multiplexing circuitry. The pixel data enters the input of stage 12-1 and is shifted through the storage devices making up neighborhood extraction portion 14 and line storage devices 24, 26. The output of the first stage 12-1 is coupled to the input of second stage 12-2 and so on up the pipeline 10. The numerals in the storage devices making up neighborhood extraction portion 14 and line storage devices 24–26 in FIG. 1 shows the position of the pixels when all of the pixels in matrix 16 have been loaded into pipeline 10. The darkened lines in matrix 16 surround those pixel values which are contained in the neighborhood extraction portion 14 for its adjacent stage 12. For example, the darkened lines in image matrix 16-1 denotes the pixels of the neighborhood windows contained in neighborhood extraction portion 14 of stage 12-1. Each pixel value is transformed when it is in the center position of the neighborhood extraction portion 14. Thus, as the pixel data propagates up the pipeline 10, it is transformed by each of the stages. For examples, pixel No. 1 which is in the center cell position of stage 12-5 has already been transformed by the previous stages by the time it reaches the position shown in FIG. 1. Note also that the transformed output of each stage is a function of a center cell or pixel and the surrounding pixels in the neighborhood window. For example, pixel 28 in stage 12-2 is the transformation output of stage 12-1 during the previous time step in which pixel 28 was contained in the center of neighborhood extraction portion 14 of the first stage 12-1.

FIG. 2 shows the pipeline 10 during the next time step after all of the pixels have been loaded from data source 18 into the pipeline 10. Note the condition of switch S1. Controller 22 will now generate appropriate signals to cause switch S1 to couple the output of stage 12-5 to the input of the first stage 12-1 over feedback line 28. Consequently, the pixel data entering stage 12-1 is not fresh data from source 18 but instead represents transformed data which has been transformed by the previous stages which have carried out the first five of the ten step sequence in this example. In other words, pixel No. 1 in stage 12-1 of FIG. 2 has already been transformed five times, once by each of the stages 12-1 to 12-5.

When pixel number 35 has been shifted into the center position of the neighborhood extraction portion 14 of stage 12-1, it will perform the last transformation pursuant to the previously programmed transformational control instructions. Before the next pixel shift, stage 12-1 is reprogrammed with new transformational control instructions from controller 22 for carrying out the sixth step in the sequence. Thus, when pixel number 1 is shifted into the center position of extraction portion 14, the neighborhood transformation logic 20 will provide a transformation output for stage 12-1 pursuant to the new instructions.

Once the last pixel, here pixel number 35, has reached the center cell in the neighborhood extraction portion 14 of the second stage 12-2, the second stage neighborhood transformation logic 20 is likewise reprogrammed. The new transformation control instructions will condition the neighborhood transformation logic 20 of the second stage 12-2 to carry out the seventh step in the ten step sequence. Thus, when pixel number 1 reaches the center cell, it will be transformed according to the new program instructions. This same operation occurs as the recirculated pixel data propagates up through the stages 12 in the pipeline 10. In other words, stage 12-3 will be programmed with the eighth transformation step instructions, stage 12-4 with the ninth, and stage 12-5 will be reprogrammed for carrying out the tenth step in the operation. Thus, the pixel values eminating from the output of stage 12-5 will be transformed ten times by only five different neighborhood transformation stages. The output of stage 12-5 may be read by controller 22 by closing switch S2. Controller 22 may then couple the transformed data to a utilization device 30. Utilization device 30 may, for example, activate an alarm or other device if a particular pattern has been detected by the foregoing ten step transformation operation sequence.

The feedback approach just described has several advantages in addition to decreasing the number of stages required to perform a particular operation. Faster image processing is obtained because the pixel data does not have to be transferred through as many input/output devices which inherently slows down the processing time. Additionally, the amount of required external storage is substantially reduced.

FIGS. 4 and 5 provide conceptual illustrations of other aspects of this invention. In the embodiment shown in FIG. 4, the pipeline 32 includes a plurality of transformation stages 1 to N. Each stage is the same as stages 12 previously discussed in connection with FIGS. 1-3 and includes neighborhood transformation logic (denoted NTL in the drawings). Similarly, the system includes a controller 34 and a utilization device 36. The data source 38, however, provides different frames of pixel data. For purpose of this invention, a frame is a matrix of pixel points of an image taken at one instance in time. For example, each frame may contain image information relating to the same budding tree taken at different times. The neighborhood transformation stages 1 to N-1 are programmed by controller 34 with a bud finding algorithm or operational sequence. Controller 34 then couples the first frame from data source 38 into the pipeline 32. The last stage N is programmed to store the transformation output of stage N-1 as represented by storage device 40. In our example, storage device 40 would contain information relating to the location and number of buds found within the first frame of pixel data. Controller 34 then couples the second frame of pixel data through the pipeline 32. Stage N is further programmed to perform a comparison between the current transformation output of stage N-1 with the contents of storage device 40 which contains information relating to the first frame. Any differences between the transformed outputs of the two frames will be detected by stage N as represented by comparator 42. The output of pipeline 42 is coupled to a utilization device 36 which, for example, may count the number of new buds on the tree that appeared in the second frame of pixel data. The transformed data of the second frame replaces that of the first frame in storage device 40. This process continues for each frame within data source 38. Consequently, each new frame selected by controller 34 will be compared with updated image information such that the number and location of new buds on the tree can be detected over a period of time.

FIG. 5 shows a particular implementation for carrying out the concept previously discussed in connection with FIG. 4. In this embodiment, a feedback line 44 serves to feedback at least a portion of the output of the stage pipeline 32 to a summation device 46. Device 46 is operative to combine new pixel data from data source 38 with previously transformed pixel data on feedback line 44. Assume that each pixel is represented by six bits. When the first frame from data source 38 is shifted through the stages of pipeline 32, the trasformation output may contain information regarding the location and number of the buds on the tree. The output of the pipeline 32 may be represented by eight bits, two of which are fed back over line 44 to summation device 46.

Controller 34 then selects the next frame of data from source 38. Summation device 46 serves to combine the two bit information associated with the first frame of data with the six bit information regarding the second frame of data. However, the pipeline stages are programmed to ignore the two bits of transformed data from the first frame. In other words, two bits for each pixel will pass through the neighborhood stages 1 to N-1 unmodified. In comparison, the six bits of new data will be transformed in the neighborhood transformation logic of each of the stages 1 to N-1. This so called "bit maksing" technique is more fully described in the aforementioned U.S. Pat. No. 4,301,443, entitled "Bit Level Enable Circuitry For An Image Analyzer System". The last stage, however, is programmed to perform a transformation on all eight bits of the pixel data. Stage N can readily be programmed to effectively compare the locations of the tree buds of the previous frame (for example, as represented by two of the bits) with the transformed data of the current frame (represented by six of the bits). Selected bits are coupled over feedback line 44 for use in analyzing the next frame. Thus, the output of transformation stage N will detect the differences between two successive frames of image data.

A wide variety of alternative uses can be readily envisioned. For example, this feedback approach can be used for filtering out noise in image data. It can also be used to detect movement of particular objects between successive frames of pixel data. One skilled in the art will appreciate that the information fed back to the pipeline 32 input can be easily varied and used in a multitude of different image processing operations.

Other modifications falling within the spirit of the present invention can be obtained by a study of the drawings, specification and the following claims.

I claim:

1. An image analyzer system comprising:
   a pipeline of serially connected neighborhood transformation stages, each stage including neighborhood extraction means for accessing substantially all of the neighborhoods in a matrix of pixels constituting an image, said image matrix being supplied to the pipeline of stages as serial digital data from a data source, and programmable neighborhood transformation logic means for analyzing the pixels contained in the neighborhood extraction means, operative to perform a neighborhood transformation thereon and provide a transformation output signal to the next stage;
   controller means for programming the neighborhood transformation logic in each of the stages before the serial image data is supplied thereto and
   feedback means for coupling the output of the last stage to the input of the first stage in the pipeline for performing subsequent transformation on the previously transformed pixel data whereby the image pixels are transformed a greater number of times than there are stages in the pipeline without requiring additional transfer of image data from the data source.

2. The system of claim 1 which further comprises:
   means for selectively coupling the data source and the feedback means to the input of the first stage wherein said pipeline is first loaded with serial pixel data from the data source and subsequently from previously transformed serial data fed back from the output of the last stage via the feedback means.

3. The system of claim 2 which further comprises read back means coupled to the controller for selectively reading the transformation output signals of the stages.

4. A method of analyzing images represented by serial pixel data of an image matrix, said method comprising the steps of:
   (a) programming each stage in a pipeline of programmable serial neighborhood transformation stages with control instructions for carrying out particular neighborhood transformations;
   (b) serially loading the pipeline with all of the pixels in the image matrix; and
   (c) feeding the output of the pipeline back to its input whereby the image pixels are transformed a greater number of times than there are stages in the pipeline.

5. The method of claim 4 which comprises before step (c) the further step of reprogramming at least some of the stages with new control instructions for carrying out different neighborhood transformations.

6. The method of claim 5 which further comprises the step of reading the output of selected stages after they have performed transformations pursuant to the new control instructions.

7. The method of claim 5 which further comprises the step of delaying the reprogramming of each stage until it has completed the previous transformation of all of the pixels in the image.

* * * * *